United States Patent
Gonzalez

(10) Patent No.: US 7,352,390 B2
(45) Date of Patent: *Apr. 1, 2008

(54) DIGITAL CAMERA FOR CAPTURING IMAGE DATA WITH RAPID RESPONSE BETWEEN ACTIVATING A CAPTURE TRIGGER AND CAPTURING IMAGE DATA

(75) Inventor: Patrick F. Gonzalez, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

This patent is subject to a terminal disclaimer.

(21) Appl. No.: 10/681,816

(22) Filed: Oct. 8, 2003

(65) Prior Publication Data

US 2005/0078197 A1    Apr. 14, 2005

(51) Int. Cl.
*H04N 5/228* (2006.01)
*H04N 5/76* (2006.01)
*G03B 17/00* (2006.01)

(52) U.S. Cl. .............................. 348/208.6; 348/231.99; 396/55

(58) Field of Classification Search ............. 348/221.1, 348/231.99, 231.1, 231.2, 231.6, 231.9, 208.6, 348/208.12, 155; 386/117; 396/55
See application file for complete search history.

(56) References Cited

U.S. PATENT DOCUMENTS

| 6,900,831 | B2 * | 5/2005 | Nishiwaki | ................ 348/208.5 |
| 7,027,087 | B2 * | 4/2006 | Nozaki et al. | ......... 348/231.99 |
| 7,057,645 | B1 * | 6/2006 | Hara et al. | ................ 348/208.6 |
| 7,154,541 | B2 * | 12/2006 | Kondo et al. | ............. 348/222.1 |
| 7,280,136 | B2 * | 10/2007 | Kuroiwa | ................. 348/231.99 |
| 2003/0133021 | A1 * | 7/2003 | Hamamura et al. | ...... 348/229.1 |
| 2003/0133614 | A1 * | 7/2003 | Robins et al. | ............... 348/143 |
| 2004/0070679 | A1 * | 4/2004 | Pope | ...................... 348/231.99 |
| 2004/0135900 | A1 * | 7/2004 | Pyle et al. | ................ 348/231.3 |
| 2005/0001908 | A1 * | 1/2005 | Lee | ......................... 348/231.2 |
| 2005/0078194 | A1 * | 4/2005 | Gonzalez | .................. 348/222.1 |
| 2007/0177021 | A1 * | 8/2007 | Shan et al. | ............. 348/208.12 |

FOREIGN PATENT DOCUMENTS

JP    09261526 A  * 10/1997
JP    2003235000 A  * 8/2003

* cited by examiner

*Primary Examiner*—John M. Villecco

(57) ABSTRACT

A digital camera has an image sensor, a capture trigger, a processing system, and a capture buffer having multiple buffer locations. The processing system receives auxiliary image frames from the image sensor and stores each auxiliary image frame in a buffer location. When the capture trigger is activated, a corresponding image frame is received by the processing system from an image sensor and stored in an available buffer location. Blur correction is performed on the corresponding image frame using at least one auxiliary image frame in at least one other buffer location. All buffer locations used for the blur correction are unavailable for storage of other data until the blur correction is complete. In one embodiment, Image frames are continuously stored in the buffer locations not designated as unavailable.

20 Claims, 8 Drawing Sheets

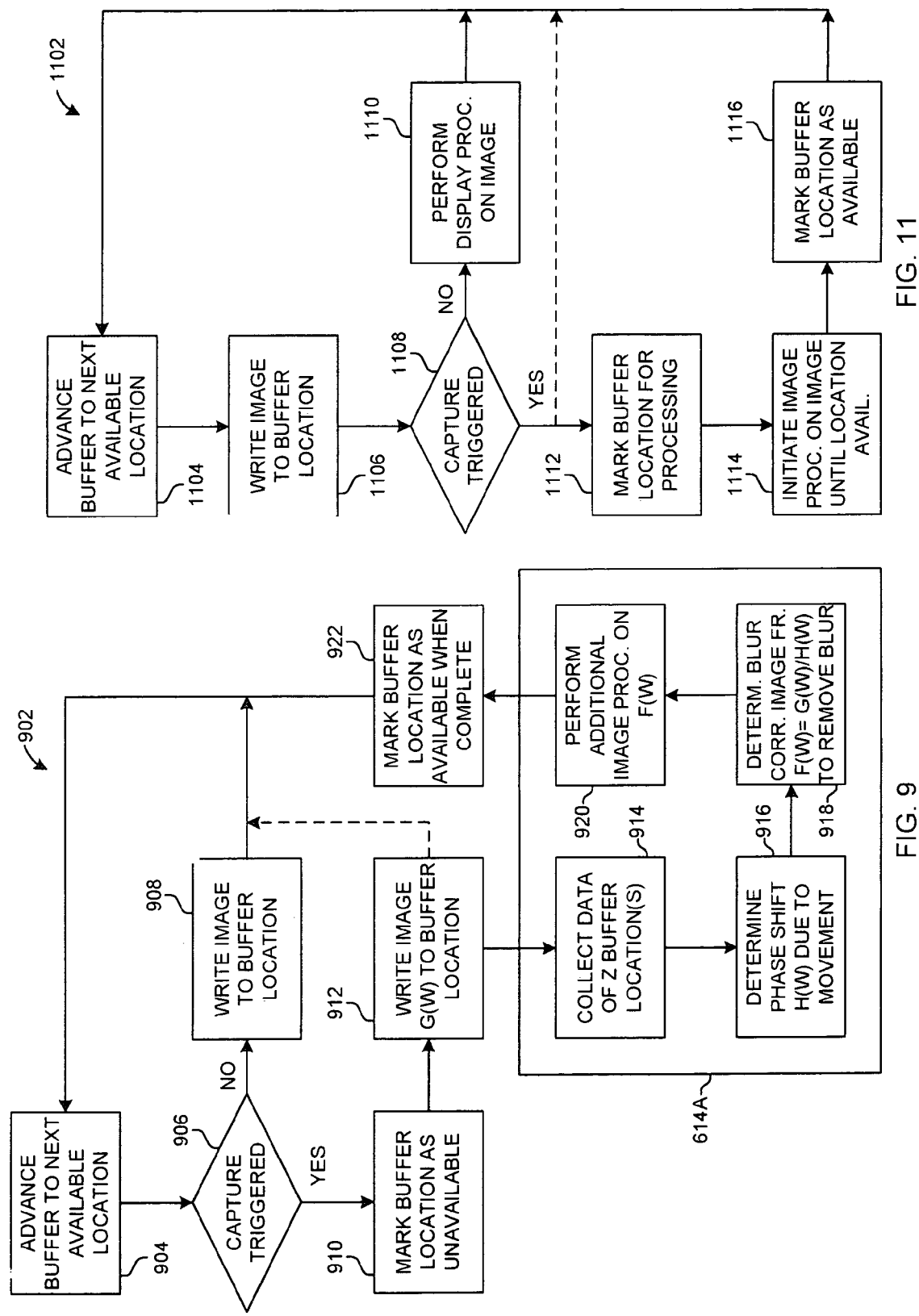

DIGITAL CAMERA FOR CAPTURING IMAGE DATA WITH RAPID RESPONSE BETWEEN ACTIVATING A CAPTURE TRIGGER AND CAPTURING IMAGE DATA

RELATED APPLICATIONS

This application is related to copending and cofiled application for U.S. patent Ser. No. 10/681,801, filed Oct. 8, 2003 and entitled SYSTEM AND METHOD FOR CAPTURING IMAGE DATA, the aforementioned application is incorporated herewith by reference thereto.

FIELD OF THE INVENTION

The present invention relates to the field of capturing image data for a digital camera.

BACKGROUND OF THE INVENTION

Digital cameras generally have a lens system and an image sensor for collecting image data. The image data is transmitted as image frames to a processing system for processing. Each image frame generally is a separate still image. As used herein, the image frames include raw image data from the image sensor that has been digitized with an analog-to-digital (A/D) converter. As used herein, "collecting" image data refers to detecting image data at an image sensor, which is then transmitted as one or more frames.

Digital cameras also have a capture trigger, such as a shutter button, to be activated by a user when the user desires to capture a specific image (the "subject image"). When the user activates the capture trigger, the processing system detects the capture trigger and designates the image data collected by the image sensor as corresponding to the specific image desired to be captured by the user.

The image frame received from the image sensor that corresponds to the capture trigger is referred to herein as a "corresponding image frame." The corresponding image frame may be collected by the image sensor just prior to triggering the capture trigger, concurrent with triggering the capture trigger, or just after triggering the capture trigger, depending on the configuration of the digital camera.

The image sensor also may collect image data that does not correspond to activation of the capture trigger. These image frames are referred to herein as "auxiliary image frames." The auxiliary image frames may be displayed on an image display, used for performing automatic focusing, or used for other processing. The auxiliary image frames may be collected from the image sensor at full resolution or less than full resolution.

The processing system of the digital camera includes one or more processors. In some digital cameras, the processing system has a processor and a co-processor. The processor generally is configured to manage camera operation and other components of the digital camera, including transmitting and receiving instructions and data to and from the other components. The co-processor is configured to perform processing intensive operations, such as compression, blur correction, automatic focus, and other image processing.

The processing system may store image data in internal memory or removable memory before, during, and/or after processing. Internal memory includes volatile memory and/or nonvolatile memory.

Volatile memory, such as random access memory, is memory that can be accessed quickly by the processing system while operating. Nonvolatile memory, such as Flash memory, is capable of storing data for significant periods of time when power is removed from the memory.

Removable memory can be inserted into and removed from the digital camera. The removable memory has an associated memory controller that communicates image data with the processing system and controls storage and retrieval of the image data to and from the removable memory.

The processing system may transmit image data from the digital camera or receive image data via a host interface, such as a universal serial bus (USB) port. The processing system controls transmitting and receiving other data and instructions via the host interface.

The processing system processes auxiliary image frames for display on the image display. This processing is referred to herein as "display processing."

During display processing, the image data optionally is subsampled to reduce the overall processing required for the auxiliary image frame. The subsampled image data then is processed in several stages. White balance and exposure adjustment adjusts the image data for white light and under or over exposure. Color processing is performed to derive proper colors for the image data and may include color filter array (CFA) interpolation and color space processing. The image data also is processed to compensate for non-linear characteristics, such as with gamma processing.

The display processed image then is transferred to an image driver. The image driver configures the image data for an associated image display and transmits the configured image data to the image display.

The processing system also processes corresponding image frames for enhancement, restoration, and color processing to produce a final image captured when the user activates the capture trigger. This processing is referred to herein as "image processing."

Image processing generally includes processing for white balance, exposure adjustment, color processing, and non-linearity compensation. Image processing generally uses a full resolution corresponding image frame. Although, less than full resolution data sometimes may be used. The processing system stores the corresponding image frame in internal memory or removable memory.

Blur correction also is performed by the processing system in some instances. Blur is caused, for example, when a subject image moves through the field of view of the camera lens. The degree of blur is dependent on how fast the subject image is moving through the field of view. Image data is processed to remove the blur.

Additional image processing may be performed, such as for edge enhancement and automatic focus. Other processing for other automatic functions may be performed.

File compression is performed at the end of image processing in some configurations. File compression standards include joint photographic experts group (JPEG) standards, graphics interchange format (GIF) formats, tagged image file format (TIFF) formats, and other formats and standards. Video and audio capture and formatting standards also may be used, such as moving pictures experts group (MPEG) standards and audio-video-interleaved (AVI) standards.

All image processing takes time and processing resources. Often while image data is being processed, the processing system is busy with image processing and is not available to capture or process new images. In other instances, a digital camera may be processing setup commands and temporarily is not able to collect corresponding images.

In such instances, the digital camera does not immediately collect corresponding image frames when the capture trigger is triggered. In some cases, several seconds may pass before the image is captured and processed. This delay commonly is referred to as "shutter delay."

Shutter delay may frustrate a user attempting to capture an image. For example, a user attempting to capture a particular moment in a child's birthday party or at a sporting event may be frustrated if shutter delay causes the digital camera to miss capturing the anticipated image. Therefore, it is desirable to have systems and methods that provide a rapid response between activating a capture trigger and capturing image data for a subject image and to provide this response as long as available memory allows.

SUMMARY

A digital camera has an image sensor, a capture trigger, a processing system, and a capture buffer having multiple buffer locations, each of which is available for storing image data. The processing system receives auxiliary image frames from the image sensor and stores each auxiliary image frame in an available buffer location. When the capture trigger is activated, a corresponding image frame is received by the processing system from the image sensor and stored in an available buffer location. Blur correction is performed on the corresponding image frame using at least one auxiliary image frame in at least one other buffer location. All buffer locations used for the blur correction are unavailable for storage of other image data until the blur correction is complete. Image frames are continuously stored in the buffer locations not designated as unavailable. In an alternate embodiment, other image processing, such as compression, is performed on the corresponding image frame.

BRIEF DESCRIPTION OF THE DRAWINGS

FIG. 9 is a block diagram illustrating another control process for continuously capturing images in accordance with an embodiment of the present invention.

FIG. 11 is a block diagram illustrating another control process for continuously capturing images in accordance with an embodiment of the present invention.

DETAILED DESCRIPTION

Figure 1:
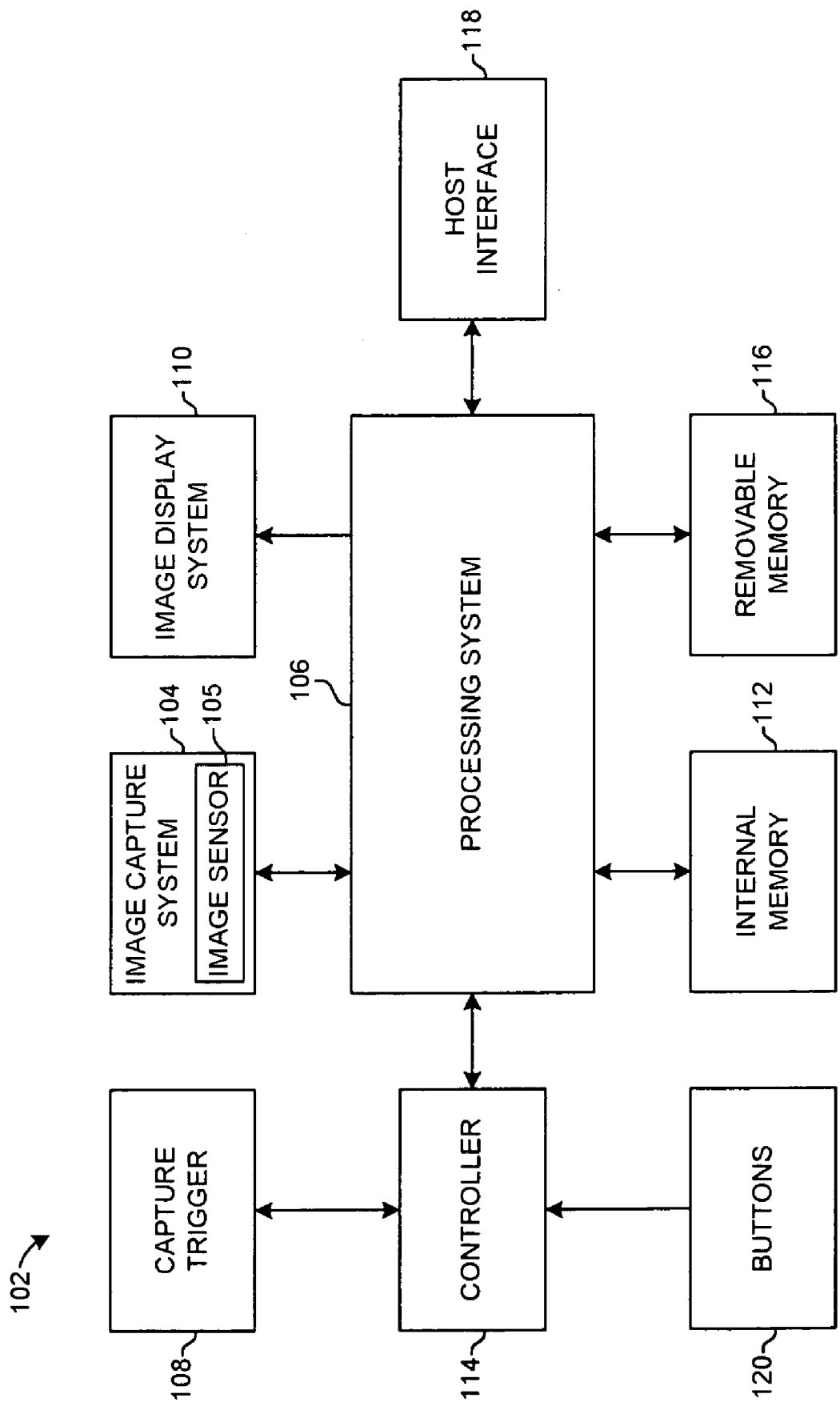
FIG. 1 is a block diagram illustrating a digital camera in accordance with an embodiment of the present invention.

FIG. 1 depicts an exemplary embodiment of a digital camera 102 of the present invention. The digital camera 102 has an image capture system 104 with a lens and an image sensor 105 for collecting image data. The image capture system 104 sends image frames to the processing system 106 for processing. In one embodiment the image frames are video image frames. In another embodiment, the image frames are still images.

In some embodiments, when the capture trigger 108 is not activated, the processing system 106 processes the image frames as auxiliary image frames. In one particular embodiment, the processing system 106 processes the auxiliary image frames for display and transfers the processed data to an image display system 110. The processing system 106 uses internal memory 112 during display processing for storage of the auxiliary image frames.

When the capture trigger 108 is activated, the controller 114 communicates the trigger signal to the processing system 106. The capture trigger 108 may be configured to activate capture of one image, multiple images, and/or video.

The processing system 106 receives the capture trigger signal and designates an image frame as a corresponding image frame. The processing system 106 processes the corresponding image frame for image processing. Thereafter, the processing system 106 stores the processed image in internal memory 112 and/or removable memory 116 and/or transmits the processed image via the host interface 118 to another device. The processing system 106 also may transmit the processed image to the image display system 110.

The processing system 106 also monitors control signals from camera buttons 120, which are transmitted to the processing system via the controller 114. The buttons may include a mode selector, a menu selector, an automatic focus trigger, a zoom, up, down, left, and right controls, and other control buttons.

In one embodiment, the digital camera 102 has a capture buffer in internal memory 112 in which one or more auxiliary image frames and/or one or more corresponding image frames are saved for image processing and/or performing automatic functions. In one embodiment, only corresponding image frames are saved in the capture buffer for image processing. In another embodiment, auxiliary image frames and corresponding image frames are saved in the capture buffer for image processing.

The capture buffer has N buffer locations, where "N" is a configurable number of buffer locations. The capture buffer is a circular buffer in which image data is saved in an available buffer location while the digital camera 102 is operating. Therefore, after an image frame is saved in the "Nth" buffer location, the next image frame is stored in the first buffer location or, if the first buffer location is not available, the next available buffer location after the first buffer location. A buffer location is unavailable for image data storage while image processing is performed on or with an image frame in that buffer location. The buffer location is again available for image data storage when the image processing is complete.

In another embodiment, the digital camera 102 has a fixed section of memory in which image frames are saved for image processing and/or automatic functions. The fixed section of memory is used in conjunction with the capture buffer in some embodiments. The image frames may be corresponding image frames and/or auxiliary image frames.

In another embodiment, the processing system 106 is configured to process an image frame with a compression algorithm before or as the image frame is saved in the capture buffer, but before image processing is performed. This compression is referred to herein as "pre-processing compression."

Pre-processing compression includes using an exponential compression algorithm, such as A-law or µ-law compression, which are known in the art. Pre-processing compression also may include discarding a selected number of least significant bits (M LSBs) from bytes of image frame data (referred to herein as the "discard mode") for each pixel before the image frame data is saved in the capture buffer. "M" is a configurable number of bits. In one embodiment, the processing system 106 is configured to discard the two LSBs. Since A/D converters normally are not programmable, and A/D converters for digital cameras often are 10 bit converters. Discarding M bits saves processing resources and results in a better number of bits for processing, such as an eight-bit byte. In another embodiment, the processing system 106 is configured to perform no compression, A-law compression, µ-law compression, discard mode compression, or another compression algorithm.

In another embodiment, blur correction processing is performed by the processing system 106. In this embodiment, image frame data is continuously collected by the image capture system 104, and auxiliary image frames are saved in available buffer locations in the capture buffer. When the capture trigger 108 is activated, the corresponding image frame is saved in a next available buffer location (t) in the capture buffer. The processing system 106 processes the corresponding image frame in buffer location (t) with the auxiliary image frames from a configurable number of additional buffer locations (z) to correct for blur. Because the image frames already were saved in the capture buffer and are available, additional image frames need not be collected and saved in this embodiment, thereby reducing delay for the blur correction. Although, in some embodiments, one or more auxiliary image frames saved after the corresponding image frame also may be used for blur correction.

In some embodiments, the processing system 106 is configured to correct for blur according to a blur correction function $\int e^{-j2\pi}(ux_o(z)+vy_o(z))dz$. The blur correction function is integrated from 0 to z, with z being the selected number of buffer locations. In this function, $x_o$ represents motion in a first direction (x), $y_o$ represents motion is a second direction (y), and (u) and (v) represent sampling integrals as the subject image moves across the field of view. The "subject image" is the image the user anticipates capturing.

The blur correction function as a whole represents a summation of sampled points, where each image frame (image data in the buffer location) is a point that is sampled. The function is integrated over time to determine a phase shift that causes the blur. The phase shift is due to movement. The result of the integrated blur correction function is a blur component. The blur component is removed from the corresponding image frame to remove the blur, resulting in a blur corrected image frame. In one embodiment, the corresponding image frame is divided by the blur component to remove the blur and to result in a blur corrected image frame. Other blur correction functions may be used.

The blur corrected image frame may be processed further for image processing, stored, or sent to the image display system 110. If no other image processing is to be performed, the blur corrected image frame generally is the final image.

In some instances, the processing system 106 reads one or more auxiliary image frames and/or a corresponding image frame from the capture buffer locations and performs image processing directly on that image data. In other instances, the processing system 106 copies one or more auxiliary image frames and/or the corresponding image frame from the buffer locations to another section of memory, such as to a fixed section of memory, and the image processing is performed on the copied data.

Figure 2:
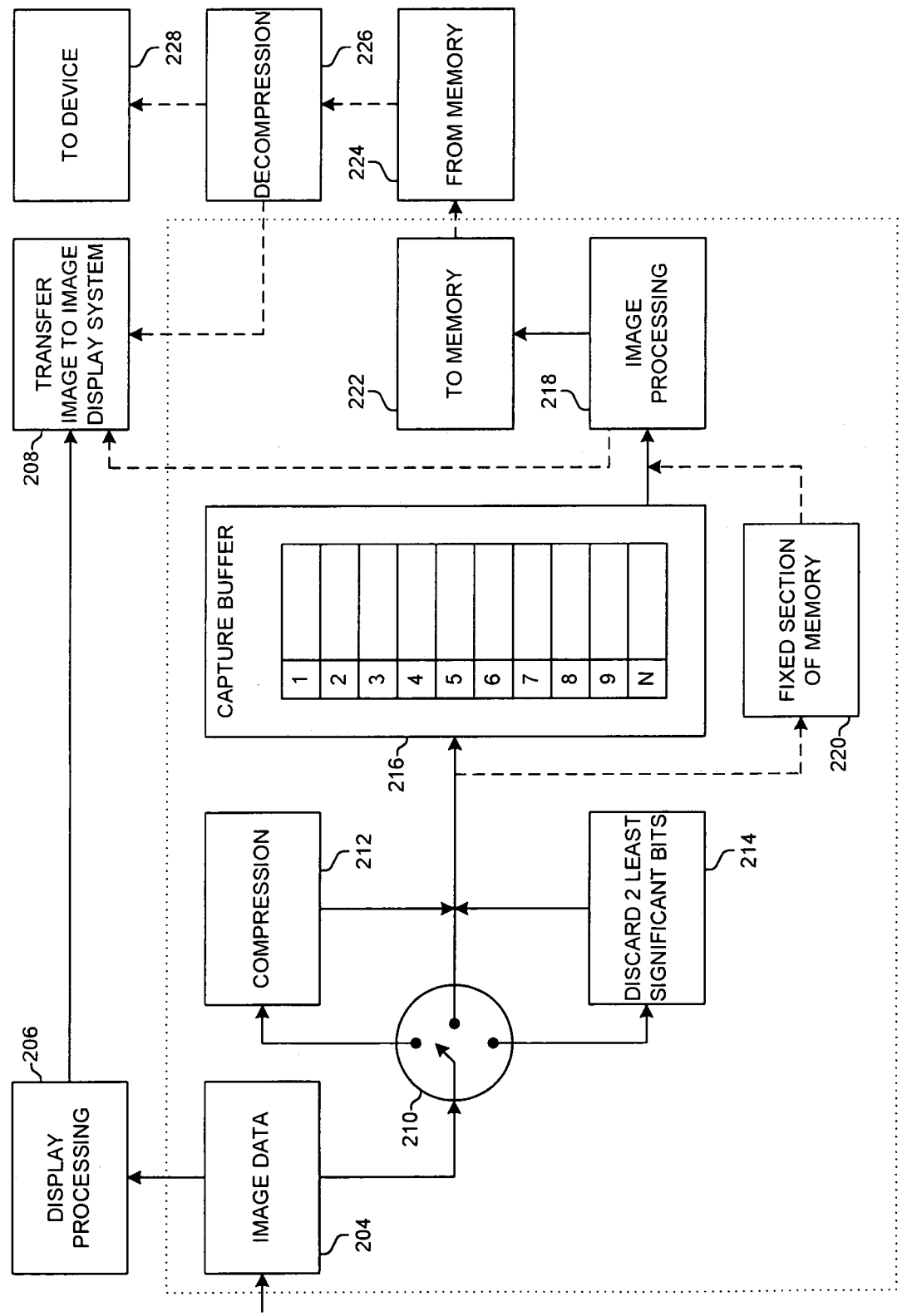
FIG. 2 is a block diagram illustrating a capture process in accordance with an embodiment of the present invention.

FIG. 2 depicts an exemplary embodiment of a capture process 202 of the present invention. The capture process 202 of FIG. 2 is operable on the processing system 106 of FIG. 1.

In the capture process 202 of FIG. 2, image frames are received from an image capture system 104 at step 204. The image frames include one or more auxiliary image frames and/or one or more corresponding image frames.

In this embodiment, the digital camera 102 is configured to display an auxiliary image frame when the digital camera is operating. In this instance, the auxiliary image frame is processed for display processing at step 206. The display processing includes subsampling the auxiliary image frame, white balancing and exposure adjusting the subsampled data, and color processing the adjusted data using CFA interpolation, color space processing, and gamma processing.

The auxiliary image frame is subsampled in this embodiment because a preview frame or image to be generated to the image display system 110 does not require full-resolution image data. Subsampling the image data typically lowers processing requirements that will be applied in later steps, such as exposure adjustment and white balance, prior to generating the image data to the image display system.

The display processed image frame is generated to an image display system 110 at step 208. This step includes configuring the image data with an image driver for an associated image display and transmitting the configured image data to the image display.

Referring still to FIG. 2, image frames, including corresponding image frames, also are processed for image processing. In this embodiment, a pre-processing compression option is selected at step 210.

If compression is selected, the compression is performed at step 212. In one embodiment, an exponential compression, such as A-law compression or µ-law compression, is performed at step 212. Other compression algorithms may be configured.

If the discard mode is selected, the two least significant bits are discarded from each two-byte pixel of image frame data at step 214. In other embodiments, greater or fewer or other bits may be discarded for the discard mode compression.

After step 212 or step 214, or if no compression is selected after step 210, the image frame is saved in the capture buffer at step 216, and image processing is performed at step 218. In one embodiment of FIG. 2, the image processing step 218 includes exposure adjustment, white balance, CFA interpolation, and color space and gamma processing. Compression optionally is included as the final stage of the image processing step 218. Other steps may be applied for image processing in other embodiments.

In one embodiment of FIG. 2, the image processing step 218 uses auxiliary image frames from one or more buffer locations (z) to image process the corresponding image frame. In one example, (t-z) buffer locations are used to process the corresponding image frame at buffer location (t)

for blur correction. In another embodiment, the image processing step 218 is performed in the background mode.

In an alternate embodiment, an auxiliary image frame is saved in the capture buffer at step 216, and a corresponding image frame is saved in a fixed section of memory at step 220. In another embodiment, a corresponding image frame is saved in the capture buffer at step 216, and an auxiliary image frame is saved in a fixed section of memory at 220. In another embodiment, an auxiliary image frame and a corresponding image frame are saved in the capture buffer at step 216 and copied to the fixed section of memory at step 220. In the above embodiments, the image processing step 218 uses one or more auxiliary image frames to image process the corresponding image frame.

Before compression is performed at the image processing step 218, the processed image frame is transmitted to the image display system at step 208. This image frame represents the final image frame and corresponds to the subject image the user anticipated capturing.

After compression is performed at the image processing step 218, the compressed image is stored in internal memory and/or removable memory at step 222. In some embodiments, compression is not performed in the image processing step 218, and the uncompressed image is stored in internal memory and/or removable memory at step 222.

Image data also may be retrieved from internal memory and/or removable memory at step 224. If necessary, the retrieved image data is decompressed at step 226. The retrieved image data then is transmitted to the image display system 110 for display at step 208 or is transmitted to another device or other memory by the processing system at step 228. At step 208, the image data is configured by an image driver for the image display and transferred to the image display.

FIGS. 3A-3D depict one example in which a capture buffer 302 may be used while performing a capture process. The capture buffer 302 has N buffer locations 304-322. In one embodiment, N=10, so that the capture buffer 302 has 10 buffer locations. In another embodiment, the capture buffer 302 includes only 5 buffer locations. In another embodiment, the capture buffer has 20 buffer locations. The number of buffer locations is configurable.

As the capture process 202 operates, data is stored continuously in a circular fashion from buffer location 1 (304) to buffer location 2 (306), on through buffer location N (322), and back to buffer location 1 in a continuous operation. If the capture trigger 112 is activated, a corresponding image frame is saved in the next available buffer location.

Image processing is performed on the corresponding image frame, and the buffer location in which the corresponding image frame is saved is unavailable for storage of other image data until image processing is completed for the corresponding image frame. The buffer location may be marked, or otherwise designated as unavailable, before, during, or after the corresponding image frame is saved in the buffer location.

Figure 3:
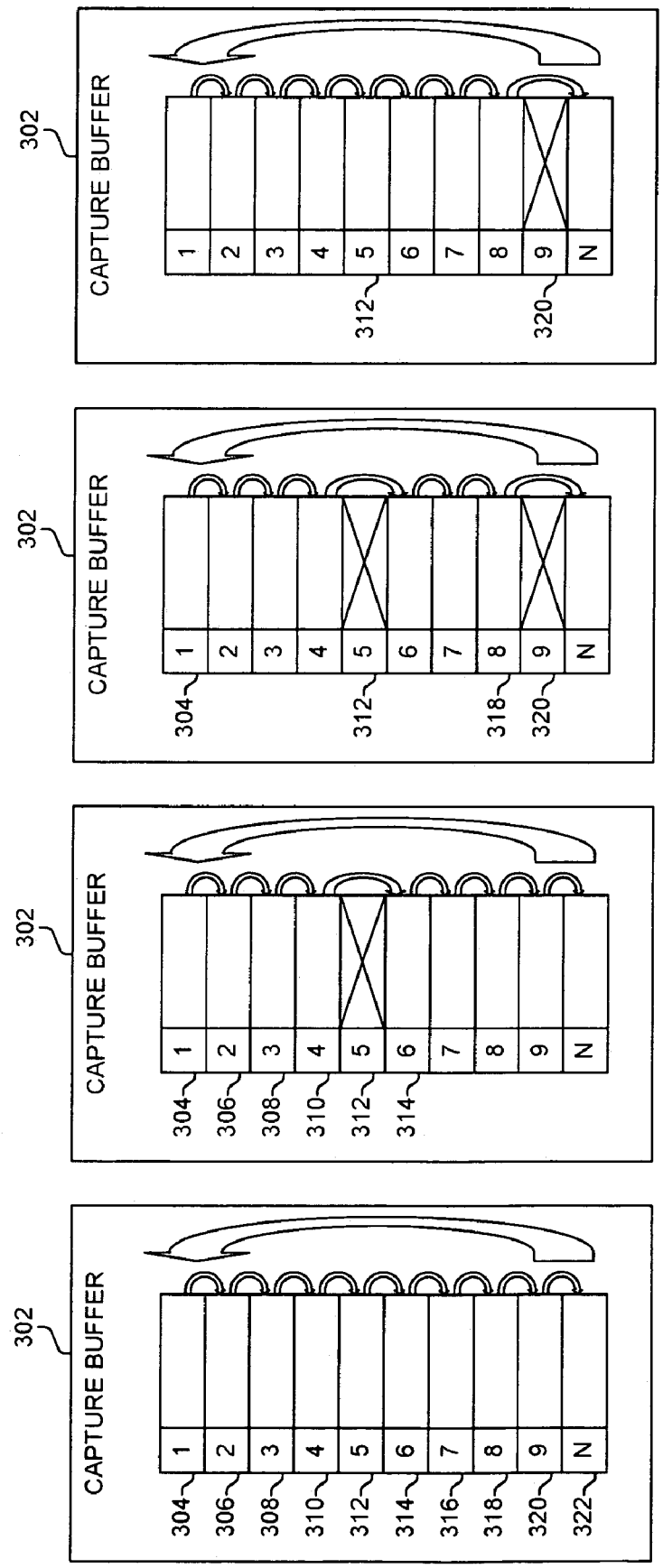
FIGS. 3A-3D are block diagrams illustrating operation of a capture buffer in accordance with an embodiment of the present invention.

Referring to one embodiment of FIG. 3A, while the capture process 202 is operating, an auxiliary image frame is saved in a first location 304 of the capture buffer 302, and a capture buffer pointer is advanced. An auxiliary image frame then is saved in the next buffer location 306, and the capture buffer pointer is again advanced. This operation continues through the $N^{th}$ buffer location 322. The capture buffer pointer then is advanced back to the first buffer location 304. The next auxiliary image frame then is saved in the first buffer location 304, and the capture buffer pointer is advanced. This process continues until the capture trigger 108 (see FIG. 1) is activated. During this process, auxiliary image frames may be used for processing automatic functions, such as automatic focus processing, and other operations.

Referring to the example of FIG. 3B, the capture trigger 108 is activated after auxiliary image frames are saved in buffer locations 1-4 (304-310) but before an image frame is saved in buffer location 5 (312). In this example, the next image frame is designated as a corresponding image frame. The corresponding image frame is saved in buffer location 5 (312), and image processing is performed on the corresponding image frame located in buffer location 5. The capture buffer pointer is advanced, and an auxiliary image frame is saved in buffer location 6 (314). Buffer location 5 (312) is unavailable for storage of image frames until the image processing for the corresponding image frame is complete.

Referring to the example of FIG. 3C, the capture buffer pointer is advanced to the first buffer location 304. Auxiliary Image frames continue to be saved in each buffer location. However, because the $5^{th}$ buffer location 312 is designated as unavailable, the $5^{th}$ buffer location is skipped.

The capture trigger 108 is activated while an auxiliary image frame is being saved in buffer location 8 (318), but before any data is saved in buffer location 9 (320). In this example, the next image frame is designated as the corresponding image frame and is saved in buffer location 9 (320). Image processing is initiated on buffer location 9 (320), and buffer location 9 is unavailable until image processing is complete for the corresponding image frame. The capture buffer pointer is advanced, and image frames continue to be saved in the available buffer locations.

Referring now to FIG. 3D, image processing is completed on the corresponding image frame located in buffer location 5 (312), and buffer location 5 is designated as available. Image frames continue to be saved in available buffer locations as described above, including buffer location 5 (312).

In some embodiments, auxiliary image frames are used for image processing in the background mode before the capture trigger is activated or between activations. This may occur, for example, with an automatic focus process, exposure adjustment, white balance, or another process.

It will be appreciated that buffer locations are marked or otherwise designated as unavailable at different periods. In one embodiment, the buffer location is marked as unavailable, and an image frame then is saved in the buffer location. In another embodiment, an image frame is saved in the buffer location, and the buffer location then is marked as unavailable. In another embodiment, an image frame is saved in the buffer location simultaneously or near simultaneously to the buffer being marked as unavailable.

For ease and consistency, the descriptions and claims provide that the buffer location is designated as unavailable. This should be understood as including first designating the buffer location as unavailable and then saving an image frame in the buffer location, first saving the image frame in the buffer location and then designating the buffer location as unavailable, or simultaneously saving the image frame in the buffer location and designating the buffer location as unavailable.

In one embodiment, the image processing is performed on the image frame as soon as the buffer location is unavailable and the corresponding image frame is collected therein. In another embodiment, the image processing is performed on the image frame in the buffer location only after all buffer locations in the capture buffer are unavailable. In one example of this embodiment, image processing is performed on all buffer locations in the capture buffer until all image frames are processed, and all of the buffer locations are available. New image frames then are collected in the buffer locations. In another example of this embodiment, image processing is performed on one buffer location in the capture buffer until the image frame in that buffer location is processed, and that buffer location is designated as available. A new image frame then is collected in that buffer location.

In other embodiments image processing is initiated when a selected number of buffer locations or a selected percentage of buffer locations are designated as unavailable. In these embodiments, image processing is performed on a selected number of one or more buffer locations before an image frame is again saved in any buffer locations.

FIGS. 4A-4D depict one example in which a capture buffer 402 may be used while performing blur correction of image data. The capture buffer 402 of FIGS. 4A-4D has N buffer locations 404-422. In one embodiment, N=10, so that the capture buffer 402 has 10 buffer locations. In another embodiment, the capture buffer 402 includes only 8 buffer locations. In another embodiment, the capture buffer has 15 buffer locations. The number of buffer locations is configurable.

In the embodiments of FIGS. 4A-4D, auxiliary image frames and corresponding image frames are saved, and the capture buffer pointer is advanced, in the same manner as described for FIGS. 3A-3D. In one example, the capture buffer has N=12 buffer locations. A corresponding image frame is saved in the eighth buffer location, and 4 prior buffer locations are used to perform blur correction processing with the corresponding image frame. In this example, t=8, z=4, and (t−z)=(8−4) buffer locations are used for blur correction. In another example, (t−5) represents current buffer location (t) and the five buffer locations after buffer location (t). In another example, z=N/2.

Generally, as the capture process 202 operates, auxiliary image frames are stored continuously in a circular fashion from buffer location 1 (404) to buffer location 2 (406), on through buffer location N (422), and back to buffer location 1 in a continuous operation. If the capture trigger 112 is activated, the corresponding image frame from the image capture system 104 is saved in the next available buffer location. One or more auxiliary image frames saved before and/or after the corresponding image frame are used for the blur correction. The buffer locations in which the auxiliary image frames used for blur correction are stored are designated as unavailable for storage of additional image frames until blur correction is completed for the corresponding image frame. The buffer location in which the corresponding image frame is saved also is designated as unavailable until blur correction is completed. The buffer locations may be marked as unavailable, or otherwise designated as unavailable, before, while, or after the image frames are saved therein.

Figure 4:
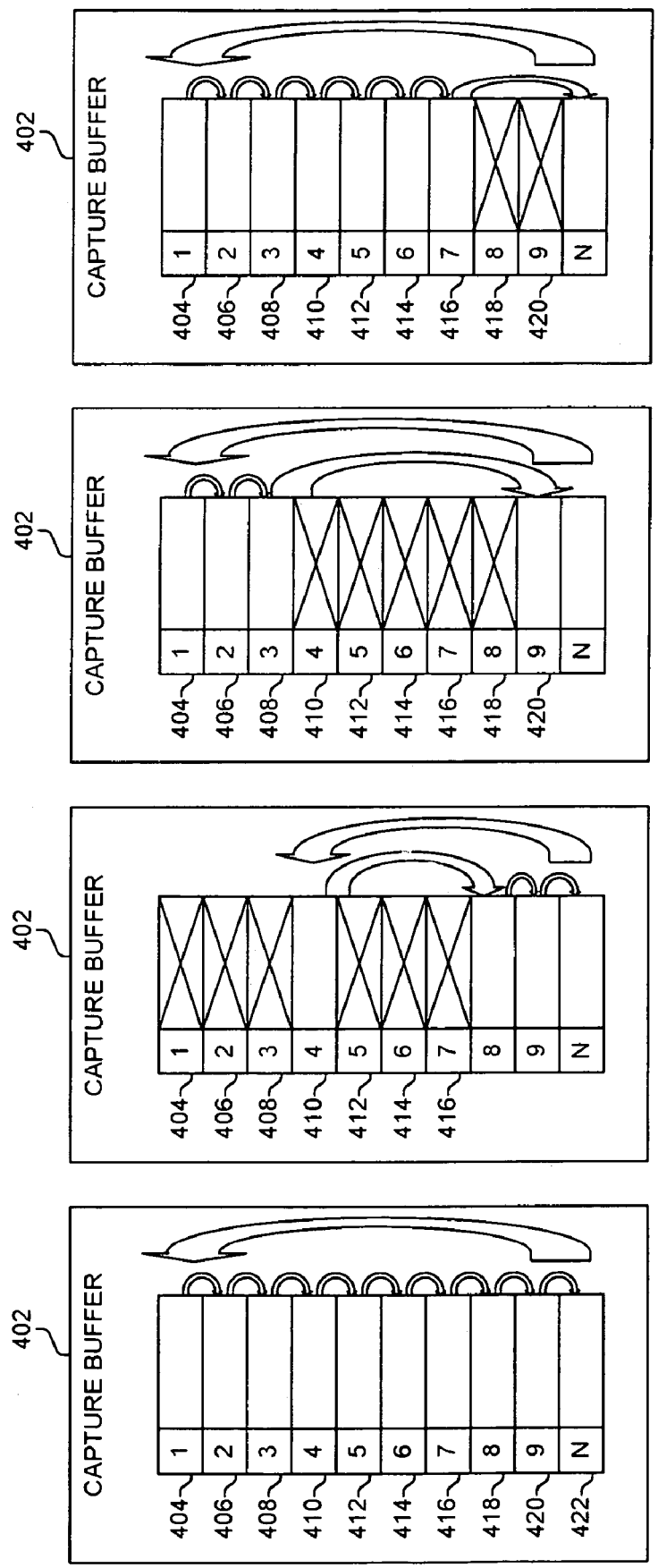
FIGS. 4A-4D are block diagrams illustrating operation of a capture buffer used for blur correction in accordance with an embodiment of the present invention.

Referring to the example of FIG. 4B, the capture trigger 108 is activated after auxiliary image frames are saved in buffer locations 1 and 2 (404 and 406) but before any data is saved in buffer location 3 (408). In this example, the next image frame detected from the image capture system is designated as the corresponding image frame and saved in buffer location 3 (408). In this example, blur correction is initiated on the corresponding image frame located in buffer location 3 (408), and the two prior auxiliary frames are used for the blur correction. Buffer locations 1, 2, and 3 (404-408) are designated as unavailable for storage of additional image data until blur correction processing is complete. The capture buffer pointer is advanced, and auxiliary image frames and/or corresponding image frames, are saved in the next available buffer locations in a circular fashion.

The capture trigger 108 is again activated after auxiliary image frames are saved in buffer locations 4-6 (410-414) but before any data is saved in buffer location 7 (416). In this example, the next image frame detected from the image capture system 104 is designated as the corresponding image frame and saved in buffer location 7 (416). In this example, blur correction is initiated on the corresponding image frame located in buffer location 7 (416), and the two prior auxiliary frames are used for the blur correction. Buffer locations 5, 6, and 7 (412-416) are designated as unavailable for storage of additional image data until blur correction processing is complete. Auxiliary image frames and/or corresponding image frames are saved in the next available buffer locations in a circular fashion.

Buffer locations 1, 2, and 3 (404-408) are made available for storage when the blur correction processing for the corresponding image frame in buffer location 3 is complete. Buffer locations 5, 6, and 7 (412-416) are made available for storage when the blur correction processing for the corresponding image frame in buffer location 7 (416) is complete.

Referring to the example of FIG. 4C, the capture trigger 108 is activated after auxiliary image frames are saved in buffer locations 1-6 (404-414) but before any data is saved in buffer location 7 (416). In this example, an image frame is detected from the image capture system 104 concurrent with the capture trigger and is designated as the corresponding image frame. The corresponding image frame is saved in buffer location 7 (416). Other auxiliary frames are received and stored in buffer locations 8 and 9 (418 and 420). In this example, blur correction is initiated on the corresponding image frame located in buffer location 7 (416), and the three prior auxiliary frames and the one succeeding auxiliary frame are used for the blur correction. Buffer locations 4-8 (410-418) are designated as unavailable for storage of additional image data until blur correction processing is complete. The capture buffer pointer is advanced, and auxiliary image frames are saved in the next available buffer locations in a circular fashion. After blur correction processing is complete, buffer locations 4-8 (410-418) are made available for storage.

Referring now to FIG. 4D, the capture trigger 108 is activated after auxiliary image frames are saved in buffer locations 1-8 (404-418) but before any data is saved in buffer location 9 (420). In this example, an image frame was sent from the image capture system 104 just before the capture trigger 108 was activated and is designated as the corresponding image frame. The corresponding image frame is saved in buffer location 9 (420). In this example, blur correction is initiated on the corresponding image frame located in buffer location 9 (420), and the auxiliary image frame saved before the corresponding image frame is used for the blur correction. Buffer locations 8 and 9 (418 and 420) are designated as unavailable for storage of additional image data until blur correction processing is complete. Thereafter, buffer locations 8 and 9 (418 and 420) are made available for storage. Auxiliary image frames and/or corresponding image frames are saved in the next available buffer locations in a circular fashion.

Figure 5:
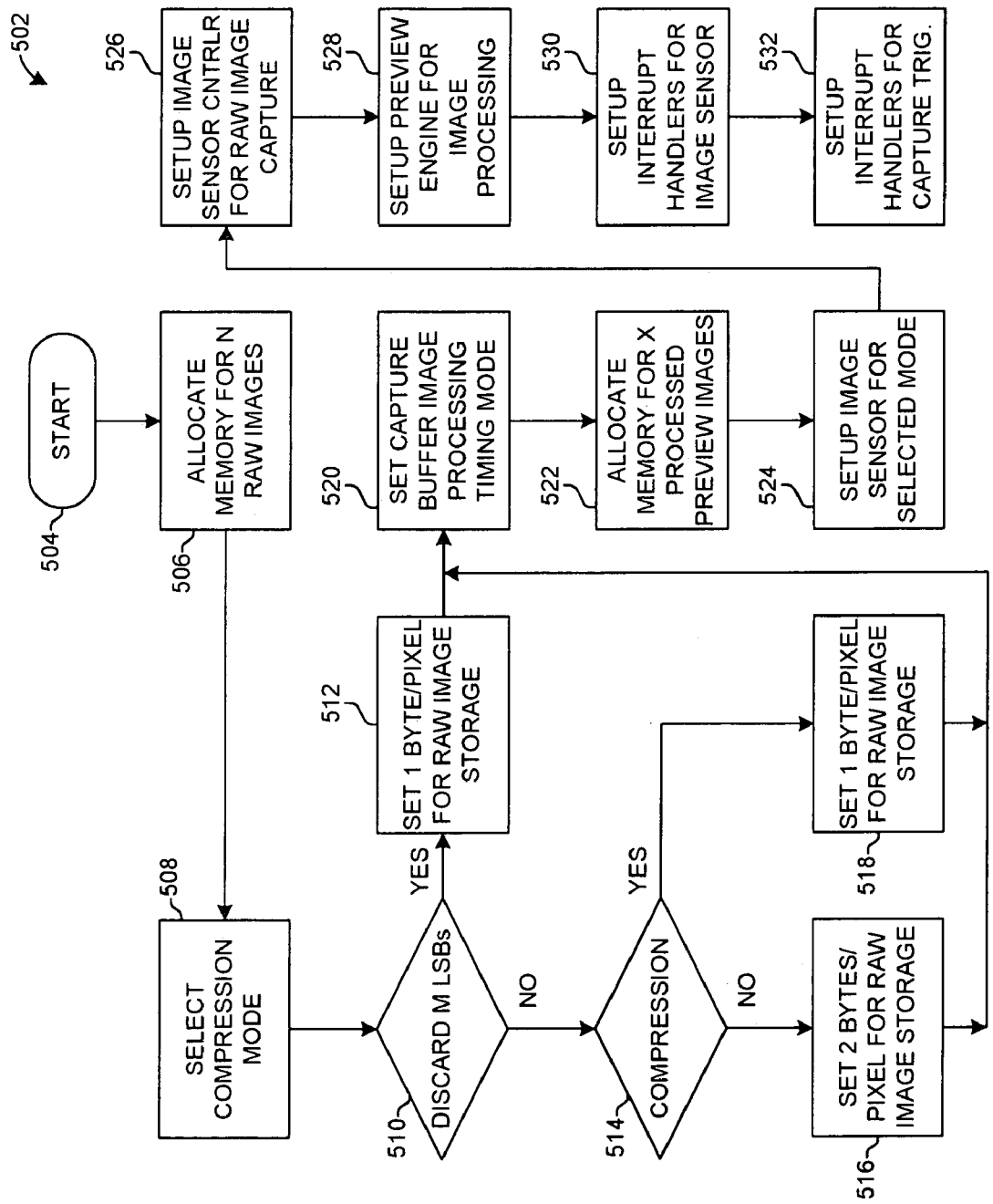
FIG. 5 is a block diagram illustrating a setup process for collecting image data in accordance with an embodiment of the present invention.

FIG. 5 depicts an exemplary embodiment of a capture set-up process. The capture set-up process 502 may be used to set-up a digital camera for a capture process. One or more image processes then may be performed.

The process starts at step 504. At step 506, the internal memory is allocated for N raw images. For example, a 3 mega pixel image frame may require more internal memory than a 2 mega pixel image frame. Therefore, the internal memory is allocated differently depending on the number of pixels selected for the image frame and other operating parameters.

The compression mode is selected at step 508. The compression mode may include no compression, A-law compression, μ-law compression, or the discard mode. If the discard mode is selected at step 510, the M least significant bits are discarded when the image frame is stored, and raw image frame storage will be set for 1 byte per pixel at step 512. If the discard mode is not selected at step 510, and no compression is selected at step 514, the raw image frame storage will be set for 2 bytes per pixel at step 516. If compression is selected at step 514, including A-law compression, μ-law compression, or other compression, then raw image frame storage will be set for 1 byte per pixel at step 518.

After step 512, step 516, or step 518, the capture buffer image processing timing mode is set at step 520. The image processing timing mode is set to determine if 1) the image frame is to be processed immediately upon activation of the capture trigger and a buffer location is designated as unavailable; 2) when all buffer locations are unavailable and until a buffer location becomes available; 3) when all buffer locations are unavailable and all buffer locations then become available; 4) when a selected number of buffer locations become unavailable; 5) until a selected number of buffer locations become available; or 6) at some other selected time or event. In one embodiment, the image processing timing mode includes processing the image frame immediately after the image frame is saved in a buffer location designated as unavailable and the image data is collected therein, processing the image frame only after the capture buffer is full and until all buffer locations become available, and processing the image frame only after the capture buffer is full and until at least one buffer location becomes available.

The internal memory is allocated for X processed preview images at step 522. X is a configurable number of processed preview images. The preview images are those images to be generated to the image display.

The image capture system is set for a selected mode of operation at step 524. The operational mode includes the number of detectors (pixels) in the image sensor, the readout of the image data from the image sensor, and other operational mode settings.

The image sensor controller is set-up for raw image data capture at step 526. This step includes setting the detector operational mode settings for the image sensor to capture the raw image data.

The preview engine is set for image processing at step 528. This step includes setting exposure and white balance, CFA interpolation, and color space and gamma processing. Other image processing may be selected.

Interrupt handlers are set for the image sensor at step 530, and interrupt handlers are set for the capture trigger at step 532. This step includes identifying whether the capture trigger is a two state trigger, a three state trigger, or another type of trigger and the operational parameters associated with each trigger or trigger state.

Figure 7:
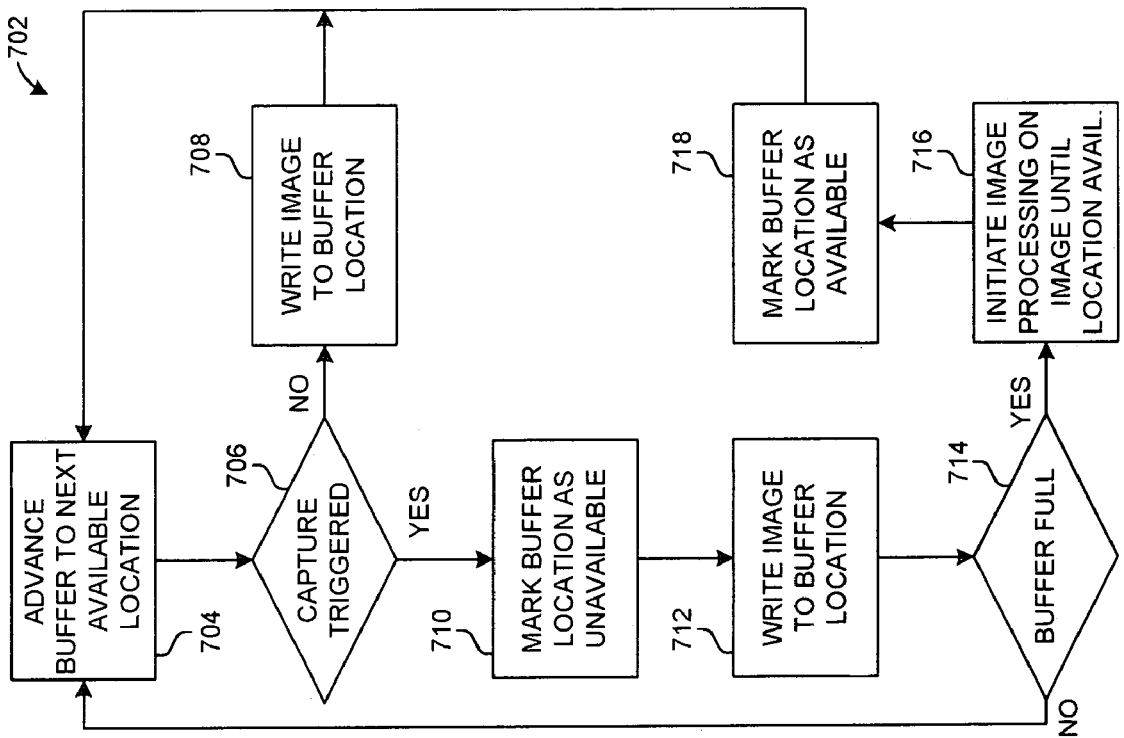
FIG. 7 is a block diagram illustrating another control process for continuously capturing images in accordance with an embodiment of the present invention.
Figure 6:
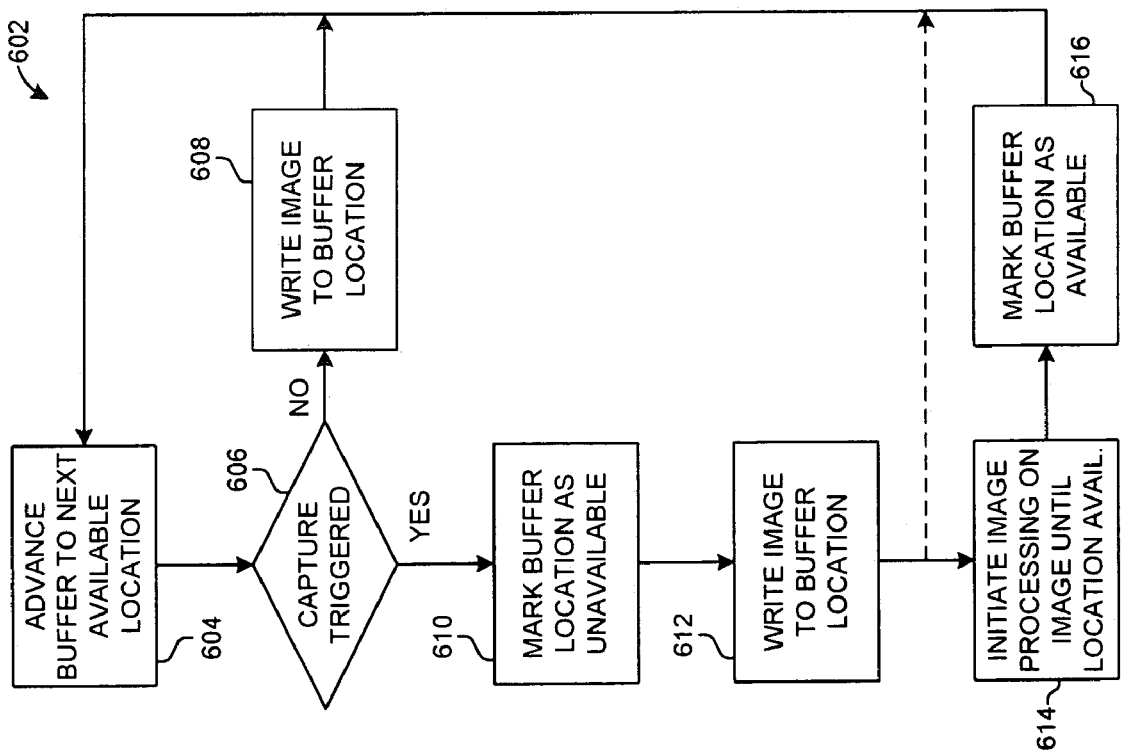
FIG. 6 is a block diagram illustrating a control process for continuously capturing images in accordance with an embodiment of the present invention.
Figure 8:
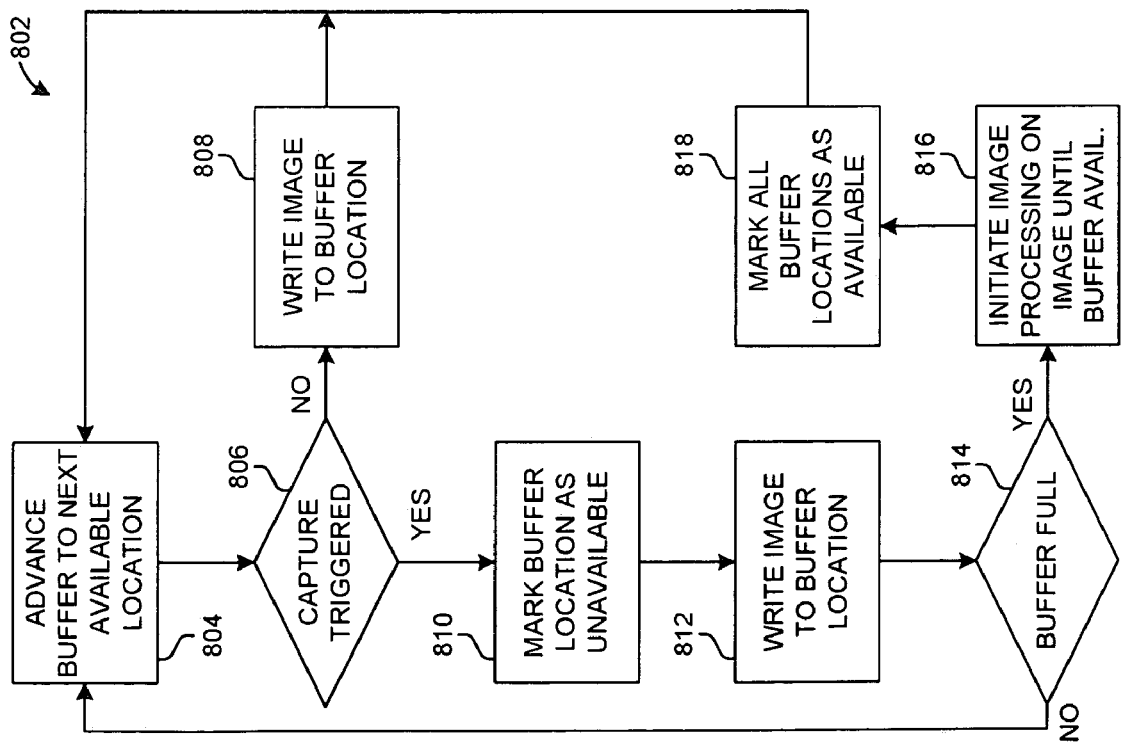
FIG. 8 is a block diagram illustrating another control process for continuously capturing images in accordance with an embodiment of the present invention.

FIGS. 6-8 depict exemplary embodiments of image data processing timing during a capture process. Although, other timing modes may be used. For ease and consistency, the descriptions of FIGS. 6-8 provide that the buffer location is designated as unavailable and the corresponding image frame is saved in the buffer location. This should be understood as including first designating the buffer location as unavailable and then saving the image data to the buffer location, first saving the image data to the buffer location and then designating the buffer location as unavailable, or simultaneously saving the image data to the buffer location and designating the buffer location as unavailable.

Referring first to the control process 602 of FIG. 6, the capture buffer pointer is advanced to the next available buffer location at step 604. When the capture process 202 first begins operating, such as when the digital camera 102 is turned on, the next available buffer location typically is the first buffer location.

If the capture trigger 108 is not activated at step 606, an auxiliary image frame is saved in the buffer location at step 608. The buffer pointer is advanced to the next available buffer location at step 604.

If the capture trigger 108 is activated at step 606, the buffer location is marked as unavailable at step 610, and the corresponding image frame is saved in the buffer location at step 612. Image processing is initiated on the corresponding image frame at step 614.

In one embodiment, the image processing includes file compression. In another embodiment, the image processing includes using auxiliary image frames from one or more buffer locations to perform the image processing on the corresponding image frame. In another embodiment, the image processing includes blur correction. In another embodiment, automatic focus processing is performed.

When the image processing is complete, the buffer location is marked as available at step 616. The process continues at step 604.

It will be appreciated that image frames are continuously saved in the capture buffer while image processing is performed at step 614 in the background mode. This is exemplified by the dashed line depicted between steps 612 and 614 leading to step 604.

FIG. 7 depicts another image data processing option in which image processing is not initiated on any buffer locations until all buffer locations are unavailable. In this embodiment, once image processing is completed on at least one buffer location, so that the buffer location becomes available, image frames again are saved in the capture buffer.

In the control process 702 of FIG. 7, the buffer pointer is advanced to the next available buffer location at step 704. When the capture process 202 first begins operation, such as when the digital camera 102 is turned on, the first buffer location typically is the next available buffer location. If the capture trigger 108 is not triggered at step 706, the image data is saved in the buffer location at step 708. The process continues at step 704.

If the capture trigger 108 is activated at step 706, the buffer location is marked as unavailable at step 710, and the corresponding image frame is saved in the buffer location at step 712. If the capture buffer is not full at step 714, such that not all buffer locations are unavailable, the process continues at step 704. If the capture buffer is full at step 714, image processing is initiated on at least one buffer location until the image processing is completed on that buffer location, and the buffer location becomes available at step 716.

In one embodiment, the image processing includes file compression. In another embodiment, the image processing includes using auxiliary image frames from one or more buffer locations to perform the image processing on the corresponding image frame. In another embodiment, the image processing includes blur correction. In another embodiment, automatic focus processing is performed.

The buffer location is marked as available at step 718. The process continues at step 704.

FIG. 8 depicts another embodiment in which image frames are continuously saved in the capture buffer, and all buffer locations are marked as unavailable before image processing is performed on any buffer location. In this example, all buffer locations then are processed for image processing until all buffer locations become available.

In the control process 802 of FIG. 8, the capture buffer pointer is advanced to the next available buffer location at step 804. When the capture process 202 is first initiated, such as when the digital camera 102 is turned on, the first buffer location typically is the next available buffer location. If the capture trigger 108 is not triggered at step 806, the image data is saved in the buffer location at step 808. The process continues at step 704.

If the capture trigger 108 is activated at step 806, the buffer location is marked as unavailable at step 810, and the corresponding image frame is saved in the buffer location at step 812. If the buffer is full at step 814, such that all buffer locations are marked as unavailable, image processing is initiated on the buffer locations until image processing is complete for all buffer locations, and all buffer locations become available at step 816.

In one embodiment, the image processing includes file compression. In another embodiment, the image processing includes using auxiliary image frames from one or more buffer locations to perform the image processing on the corresponding image frame. In another embodiment, the image processing includes blur correction. In another embodiment, automatic focus processing is performed.

All buffer locations then are marked available at step 818, and the process continues at step 804.

FIG. 9 depicts another data image processing option in which auxiliary image frames are used to perform image processing on the corresponding image frame. While the process of FIG. 9 depicts performing the image processing after the corresponding image frame is saved, it will be appreciated that the image processing can be performed at other periods.

In the control process 902 of FIG. 9, the capture buffer pointer is advanced to the next available buffer location at step 904. When the process first begins operating, such as when the digital camera 102 is turned on, the next available buffer location typically is the first buffer location. If the capture trigger 108 is not triggered at step 906, image data is saved in the buffer location at step 908, and the buffer pointer is advanced to the next available buffer location at step 904.

If the capture trigger 108 is activated at step 906, the buffer location is marked as unavailable at step 910, and the corresponding image frame is saved in the buffer location at step 912. The corresponding image frame is represented by the function G(W).

The auxiliary image frames in Z other buffer locations are used at step 914 and marked as unavailable. The number of buffer locations from which auxiliary image frames are used at step 914 is configurable. In one embodiment, the auxiliary image frames from the prior four buffer locations are used for image processing. In another embodiment the auxiliary image frames from the prior N/2 buffer locations are used, where N is the number of buffer locations in the capture buffer. In another embodiment, the auxiliary image frames from the 4 next buffer locations are used. In another embodiment, auxiliary image frames from prior and next buffer locations are used. Image data from greater or fewer buffer locations can be used. The image frame data may be read out and processed directly or copied to another memory location prior to processing.

The phase shift H(W) due to movement is determined at step 916. In one example, the phase shift is determined by a blur correction function of $\int e^{-j2\pi(ux_o(z)+vy_o(z))}dz$. The blur correction function is integrated from 0 to z, z being the selected number of buffer locations used to process the corresponding image frame for blur processing. In this function, $x_o$ represents motion in a first direction (x), $y_o$ represents motion is a second direction (y), and (u) and (v) represent sampling integrals as a subject image moves across the field of view.

The blur corrected image frame is determined at step 918. In one embodiment, the fblur corrected image frame F(W) is equal to G(W)/H(W).

Additional image processing is performed on the image data for the blur corrected image frame F(W) at step 920. This image processing may include white balance, exposure adjustment, color processing, gamma processing, and/or file compression.

When the image processing is complete, the buffer locations used for the blur correction processing are marked as available at step 922. The process continues at step 904.

It will be appreciated that image frames are continuously saved in the capture buffer while image processing is performed at step 914. This is exemplified by the dashed line depicted from step 912 leading to step 904.

Figure 10:
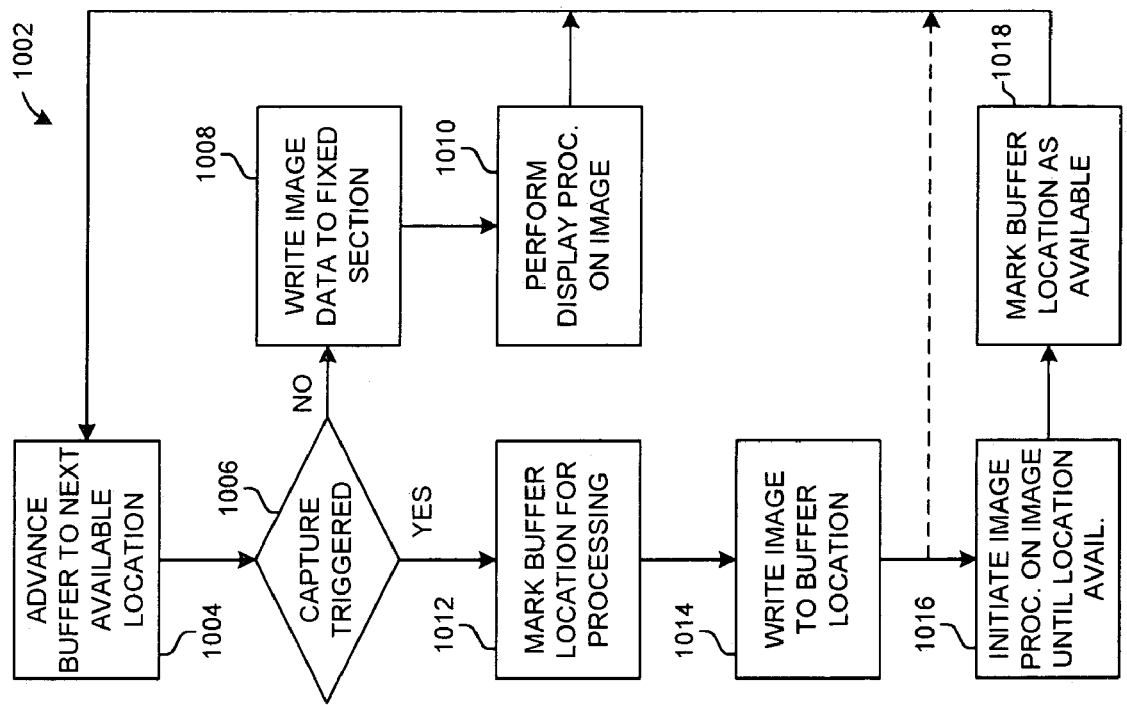
FIG. 10 is a block diagram illustrating another control process for continuously capturing images in accordance with an embodiment of the present invention.

FIG. 10 depicts an embodiment of a control process in which one or more auxiliary image frames are continuously saved in a fixed section of memory, and a corresponding image frame is saved in a capture buffer. In the control process of FIG. 10, the image frames saved in the fixed section of memory may be processed for automatic functions, such as automatic focus, or other processing functions. In other embodiments, image processing is not performed separately on the auxiliary image frames in the fixed section. Instead, the auxiliary image frames in the fixed section are used when a corresponding image frame is processed.

When a capture trigger 108 is activated, the corresponding image frame is saved in the capture buffer, and image processing is performed on the corresponding image frame. In one embodiment, an auxiliary image frame in the fixed section is used for the image processing.

In one embodiment, memory is allocated for the fixed section and the capture buffer. For example, the fixed section is allocated for image data for one or more image frames, a selected amount of pixels, or another setup. In this example, the set-up process of FIG. 5 may be used but modified to allocate internal memory 112 for the fixed section and the capture buffer at step 506. Additionally, step 520 would be modified by setting an image processing timing mode for the capture buffer.

In the control process 1002 of FIG. 10, the capture buffer pointer is advanced to the next available buffer location at step 1004. When the capture process 202 is first initiated, such as when the digital camera 102 is turned on, the first buffer location typically is the next available buffer location. If the capture trigger 108 is not triggered at step 1006, the auxiliary image frame is saved in the fixed section at step 1008.

Display processing is optionally performed on one or more auxiliary image frames at step 1010, and the control process 1002 resumes at step 1004. In some embodiments, the processed frames are provided to an image display system 110. Image data is continuously saved in the fixed section until the capture trigger 108 is activated at step 1006.

If the capture trigger 108 is activated at step 1006, the current available buffer location of the capture buffer is marked for processing at step 1012. The corresponding image frame is saved in the buffer location at step 1014. Image processing is initiated on the buffer location at step 1016 until the buffer location becomes available.

The image processing is performed at a configurable time, including immediately after capturing the image frame, when the buffer is full and until at least one buffer location is available, and when the buffer is full and all the buffer locations become available. The image processing performed at step 1016 may use image data saved in the fixed section in some embodiments.

When the image processing is complete, the buffer location is marked available at step 1018, and the process continues at step 1004. In one embodiment, auxiliary image frames are continuously saved in the fixed section while image processing is performed at step 1016 in the background mode. This is exemplified by the dashed line depicted between steps 1014 and 1016 leading to step 1004.

FIG. 11 depicts another embodiment of a control process in which image frames are continuously saved in a capture buffer. In the control process of FIG. 11, when the capture trigger 108 is activated, the image frame that was just saved in a buffer location is designated the corresponding image frame.

In the control process 1102 of FIG. 11, the capture buffer pointer is advanced to the next available buffer location at step 1104. When the capture process 202 is first initiated, such as when the digital camera 102 is turned on, the first buffer location typically is the next available buffer location. An image frame is saved in the buffer location at step 1106.

If the capture trigger 108 is not activated at step 1108, display processing is performed on the image frame at step 1110. The display processing step 1110 is optional for some embodiments.

If the capture trigger 108 is activated at step 1108, the buffer location in which the image data was just collected is marked for processing at step 1112. Image processing is initiated on the image frame in the buffer location at step 1114. The image processing may be performed at a configurable time, including immediately after capturing the image frame, when the capture buffer is full and until at least one buffer location is available, and when the capture buffer is full and after all the buffer locations are available. The image processing performed at step 1114 may use auxiliary image frames from one or more other buffer locations in some embodiments.

When the image processing is complete, the buffer location is marked as available at step 1116. The process continues at step 1104. In one embodiment, when the capture trigger 108 is activated at step 1108, and the buffer location is marked for processing at step 1112, the process continues to collect image frames while the image processing is performed at step 1114 in the background mode. This is exemplified by the dashed line depicted between steps 1110 and 1112 leading to step 1104.

Those skilled in the art will appreciate that variations from the specific embodiments disclosed above are contemplated by the invention. The invention should not be restricted to the above embodiments, but should be measured by the following claims.

What is claimed is:

1. A digital camera for capturing an image comprising:
    an image sensor;
    a capture trigger;
    a capture buffer configured as a first memory location comprising a plurality of buffer locations, each of which is available for storing auxiliary image frames;
    a second memory location separate from the capture buffer, the second memory location configured to store image frames, wherein each image frame corresponds to an associated auxiliary image frame;
    a processing system configured to continuously receive and process the auxiliary image frames during auxiliary mode of the digital camera and before the capture trigger is activated, to store the auxiliary frames in the first memory location, to detect activation of the capture trigger and receive a corresponding image frame from the image sensor, to store the corresponding image frame in the second memory location, to perform blur correction on the corresponding image frame using at least one auxiliary image frame, to designate as unavailable for image storage the buffer locations in which the corresponding image frame and the at least one auxiliary image frame are stored until the blur correction is complete and to copy one or more auxiliary image frames to the second memory location for performing image processing on the image frames and the copied corresponding auxiliary image frames in the second memory location.

2. The digital camera of claim 1 wherein the processing system further is configured to perform blur correction on the corresponding image frame using a plurality of auxiliary image frames and to designate the buffer locations in which the plurality of auxiliary image frames are stored as unavailable for image storage until the blur correction is complete, wherein the second memory location is a fixed section of memory configured to be used for image processing and automatic functions and wherein the image frames are video image frames.

3. The digital camera of claim 2 wherein the plurality of auxiliary image frames comprise at least one auxiliary image frame before the corresponding image frame and one auxiliary image frame after the corresponding image frame.

4. The digital camera of claim 2 wherein the plurality of auxiliary image frames comprise a plurality of auxiliary image frames before the corresponding image frame.

5. The digital camera of claim 1 wherein the processing system further is configured to perform the blur correction by:
    determining a blur component from the at least one auxiliary image frame; and
    removing the blur component from the corresponding image frame to determine a blur corrected image frame.

6. The digital camera of claim 5 wherein the processing system further is configured to determine the blur component by integrating a blur correction function for the at least one auxiliary image frame.

7. The digital camera of claim 5 wherein the processing system further is configured to correct for blur according to a blur correction function $\int e^{-j2\pi(ux_o(z)+vy_o(z))}dz$, the blur correction function being integrated from 0 to z, with z being a selected number of buffer locations, wherein, $x_o$ represents motion in a first direction (x), $Y_o$ represents motion is a second direction (y), and (u) and (v) represent sampling integrals as a subject image moves across a field of view of the camera and the subject image is the image the user anticipates capturing.

8. The digital camera of claim 1 wherein the processing system further is configured to detect a second activation of the capture trigger and to receive a second corresponding image frame from the image sensor, to store the second corresponding image frame in a second available buffer location, to perform second blur correction on the second corresponding image frame using at least one second auxiliary image frame, and to designate the buffer locations in which the second corresponding image frame and the at least one second auxiliary image frame are stored as unavailable for image storage until the second blur correction is complete.

9. The digital camera of claim 1 wherein the processing system further is configured to compress the corresponding image frame prior to storing the corresponding image frame in the another available buffer location with at least one compression algorithm selected from a group consisting of A-law compression, μ-law compression, and discard mode compression.

10. A method for capturing an image in a digital camera, the method comprising:

using a capture buffer configured as a first memory location having a plurality of buffer locations, each of which is available for storing auxiliary image frames;

using a second memory location separate from the capture buffer, the second memory location configured to store image frames, wherein each image frame corresponds to an associated auxiliary image frame;

continuously receiving and processing the auxiliary image frames during auxiliary mode of the digital camera and before a capture trigger is activated;

storing the auxiliary frames in the first memory location;

detecting activation of the capture trigger at the processing system and storing a corresponding image frame from the image sensor in another available buffer location;

performing blur correction with the processing system on the corresponding image frame using at least one auxiliary image frame, wherein the buffer locations are designated as unavailable for image storage until the blur correction is complete; and copying one or more auxiliary image frames to the second memory location, wherein image processing is performed on the image frames and the copied corresponding auxiliary image frames in the second memory location.

11. The method of claim 10 further comprising designating the buffer locations in which the corresponding image frame and the at least one auxiliary image frame are stored as unavailable for image storage until the blur correction is complete, wherein the second memory location is a fixed section of memory configured to be used for image processing and automatic functions and wherein the image frames are video image frames.

12. The method of claim 10 further comprising performing blur correction on the corresponding image frame using a plurality of auxiliary image frames and designating the buffer locations in which the corresponding image frame and the plurality of auxiliary image frames are stored as unavailable for image storage until the blur correction is complete.

13. The method of claim 12 wherein using a plurality of auxiliary image frames comprises using at least one auxiliary image frame before the corresponding image frame and at least one auxiliary image frame after the corresponding image frame.

14. The method of claim 12 wherein using a plurality of auxiliary image frames comprises using a plurality of auxiliary image frames before the corresponding image frame.

15. The method of claim 10 wherein performing the blur processing step comprises:

determining a blur component from the at least one auxiliary image frame; and removing the blur component from the corresponding image frame to determine a blur corrected image frame.

16. The method of claim 15 wherein the determining the blur component step comprises integrating a blur correction function for the at least one auxiliary image frame.

17. The method of claim 15 wherein removing the blur includes a blur correction function $\int e^{-j2\pi(ux_o(z)+vy_o(z))}dz$, the blur correction function being integrated from 0 to z, with z being a selected number of buffer locations, wherein, $x_o$ represents motion in a first direction (x), $Y_o$ represents motion is a second direction (y), and (u) and (v) represent sampling integrals as a subject image moves across a field of view of the camera and the subject image is the image the user anticipates capturing.

18. The method of claim 10 further comprising:

detecting a second activation of the capture trigger at the processing system and storing a second corresponding image frame from the image sensor in a second another available buffer location; and performing blur correction with the processing system on the second corresponding image frame using at least one second auxiliary image frame.

19. The method of claim 10 further comprising compressing the corresponding image frame prior to storing the corresponding image frame in the another available buffer location with at least one compression algorithm selected from a group consisting of A-law compression, μ-law compression, and discard mode compression.

20. A method for capturing an image in a digital camera, the method comprising:

using a capture buffer configured as a first memory location having a plurality of buffer locations, each of which is available for storing auxiliary image frames;

using a second memory location separate from the capture buffer, the second memory location configured to store image frames, wherein each image frame corresponds to an associated auxiliary image frame;

continuously receiving and processing the auxiliary image frames during auxiliary mode of the digital camera and before a capture trigger is activated;

storing the auxiliary frames in the first memory location;

detecting activation of the capture trigger at the processing system and storing a corresponding image frame from the image sensor in the second memory location;

copying one or more auxiliary image frames to the second memory location, wherein image processing is performed on the image frames and the copied corresponding auxiliary image frames in the second memory location; and performing blur correction with the processing system on the corresponding image frame using at least one of the plurality of auxiliary image frames in the first section of memory, wherein the buffer locations are designated as unavailable for image storage until the blur correction is complete.

* * * * *

UNITED STATES PATENT AND TRADEMARK OFFICE
CERTIFICATE OF CORRECTION

| | |
|---|---|
| PATENT NO. | : 7,352,390 B2 |
| APPLICATION NO. | : 10/681816 |
| DATED | : April 1, 2008 |
| INVENTOR(S) | : Patrick F. Gonzalez |

Page 1 of 1

It is certified that error appears in the above-identified patent and that said Letters Patent is hereby corrected as shown below:

In column 5, line 47, delete "motion is" and insert -- motion in --, therefor.

In column 14, line 11, delete "motion is" and insert -- motion in --, therefor.

In column 16, line 59, in Claim 7, delete "motion is" and insert -- motion in --, therefor.

In column 18, line 16, in Claim 17, delete "motion is" and insert -- motion in --, therefor.

Signed and Sealed this

Twenty-eighth Day of April, 2009

JOHN DOLL
*Acting Director of the United States Patent and Trademark Office*